US012754517B2

(12) United States Patent
Ummel

(10) Patent No.: US 12,754,517 B2
(45) Date of Patent: Oct. 6, 2026

(54) CONTRAST ADJUSTMENT SYSTEM FOR A DISPLAY DEVICE

(71) Applicant: Omega SA, Biel/Bienne (CH)

(72) Inventor: Antoine Ummel, Neuchâtel (CH)

(73) Assignee: OMEGA SA, Biel/Bienne (CH)

( * ) Notice: Subject to any disclaimer, the term of this patent is extended or adjusted under 35 U.S.C. 154(b) by 194 days.

(21) Appl. No.: 18/535,250

(22) Filed: Dec. 11, 2023

(65) Prior Publication Data

US 2024/0210894 A1 Jun. 27, 2024

(30) Foreign Application Priority Data

Dec. 23, 2022 (EP) .................................... 22216511

(51) Int. Cl.
*G04G 9/00* (2006.01)
*G04B 43/00* (2006.01)
*G04G 17/08* (2006.01)

(52) U.S. Cl.
CPC ......... *G04G 9/0017* (2013.01); *G04B 43/005* (2013.01); *G04G 17/08* (2013.01)

(58) Field of Classification Search
None
See application file for complete search history.

(56) References Cited

U.S. PATENT DOCUMENTS 3,030,763 A * 4/1962 Klingenberg .......... G04B 37/02 368/291
3,740,944 A * 6/1973 Chopard .............. G04B 43/005 368/286
5,986,808 A 11/1999 Wang
2016/0287142 A1 10/2016 Han et al.
2017/0185048 A1 6/2017 Yuen
2018/0196396 A1 7/2018 Cho et al.
2019/0304399 A1* 10/2019 Suenaga .................. G09G 5/10
2022/0179368 A1 6/2022 Franzi
2022/0179369 A1 6/2022 Perruchoud et al.

(Continued)

FOREIGN PATENT DOCUMENTS

CH 716914 A2 6/2021
CH 718 145 A2 6/2022

(Continued)

OTHER PUBLICATIONS

European Search Report for EP 22 21 6511 dated Jun. 6, 2023.

*Primary Examiner* — Renee S Luebke
*Assistant Examiner* — Matthew Daniel Hwang
(74) *Attorney, Agent, or Firm* — Sughrue Mion, PLLC

(57) ABSTRACT

A contrast adjustment system (100) for a display device of a watch (10), the case (12) of which can be removably arranged in an enclosure (4) of a thermal protection housing (1) for mechanical and/or functional components (5) of the watch (10), the display device being arranged facing a crystal (6) of the housing (1), the housing (1) including a reversible fastening device (13) fastening the case (12) of a watch (10) in the enclosure (4) while keeping it away from functional elements (15) of this housing (1), the elements (15) forming this enclosure (4) including a middle (**9*a*), a back (9*b*) and the crystal (6) of this housing (1), the system (100) including an electronic device (110) configured to adjust the contrast of the display device when the electronic device (110) and the housing (1**) are connected to each other.

11 Claims, 1 Drawing Sheet

(56) References Cited

U.S. PATENT DOCUMENTS

| | | | | |
|---|---|---|---|---|
| 2022/0180614 | A1 | 6/2022 | Staton et al. | |
| 2022/0390900 | A1* | 12/2022 | Willemin ............... | G04B 19/32 |

FOREIGN PATENT DOCUMENTS

| | | | |
|---|---|---|---|
| CH | 718146 | A2 | 6/2022 |
| CN | 105068413 | A | 11/2015 |
| EP | 3 163 360 | A2 | 5/2017 |
| EP | 3 163 360 | A3 | 5/2017 |
| EP | 4 105 736 | A1 | 12/2022 |
| EP | 4 105 737 | A1 | 12/2022 |
| KR | 10-2016-0119612 | A | 10/2016 |
| KR | 10-2017-0006761 | A | 1/2017 |
| KR | 10-2022-0081896 | A | 6/2022 |

* cited by examiner

CONTRAST ADJUSTMENT SYSTEM FOR A DISPLAY DEVICE

CROSS REFERENCE TO RELATED APPLICATION

This application claims priority to European Patent Application No. 22216511.0 filed Dec. 23, 2022, the entire contents of which are incorporated herein by reference.

TECHNICAL SCOPE OF THE INVENTION

The invention relates to a system for adjusting the contrast of a display device of a watch housed in a thermal protection housing.

TECHNOLOGICAL BACKGROUND

A watch typically comprises a bracelet and a watch case with several mechanical, electrical or electronic components. It is known in the prior art that some of these components cannot withstand certain temperatures, and cease to function correctly at these temperatures. One existing solution is to arrange the case of this watch in a dewar housing in order to protect such components and is described in document CH718146A2.

However, there is a need to be able to use a watch in environments likely to be subjected to such temperatures, and in particular to be able to accurately and efficiently read the information present on the display device of such a watch.

SUMMARY OF THE INVENTION

To this end, the invention relates to a contrast adjustment system for a watch display device, the case of which is capable of being removably arranged in a housing for thermally protecting mechanical and/or functional components of said watch, the system comprising:

- said housing, comprising:
  - an enclosure for thermally protecting the mechanical and/or functional components of said watch, said enclosure being formed by functional elements of this housing, these elements comprising a middle, a back and a crystal including a device for dynamically varying the brightness on a visible face of the display device;
  - a reversible fastening device fastening said watch case in said enclosure and keeping it away from the functional elements;
  - a control unit connected to the dynamic brightness variation device of the crystal, said control unit comprising event sensors capable of causing a variation in the ambient brightness in the environment of the housing;
- the watch comprising the display device and the case capable of being removably arranged in said enclosure with the display device facing the crystal of said housing;
- an electronic device configured to contribute, alongside the control unit provided with its sensors, to controlling the dynamic brightness variation device so as to adjust the contrast of the display device.

In other embodiments:

- the display device comprises a visible face capable of contributing to the display of information relating to time indications or functions implemented by the watch, which visible face is positioned facing the crystal of the housing;
- the dynamic brightness variation device of the crystal is capable of being penetrated by any light radiation entering the enclosure of the housing;
- said electronic device is configured to adjust the contrast of the display device by generating and transmitting at least one instruction for controlling the dynamic brightness variation device of this crystal;
- a control unit of the housing is configured to vary the contrast of the display device as a function of said at least one received instruction for controlling the dynamic brightness variation device;
- the control unit of the thermal protection housing is connected via a connecting element to the dynamic brightness variation device of the crystal;
- the dynamic brightness variation device of the crystal is a lighting element, in particular a transparent lighting element of the OLED type;
- the electronic device comprises a communication unit and a controller configured to control this communication unit;
- said electronic device is configured to be connected to said housing using wireless connection technologies;
- said enclosure is under vacuum or quasi-vacuum;
- the crystal has a surface area that is substantially greater than or strictly greater than that of the watch case crystal.

BRIEF DESCRIPTION OF THE FIGURES

Other specific features and advantages will be clearly observed in the following description, which is given as a rough guide and in no way as a limiting guide, with reference to the accompanying figures, in which.

DETAILED DESCRIPTION OF THE INVENTION

Figure 1:
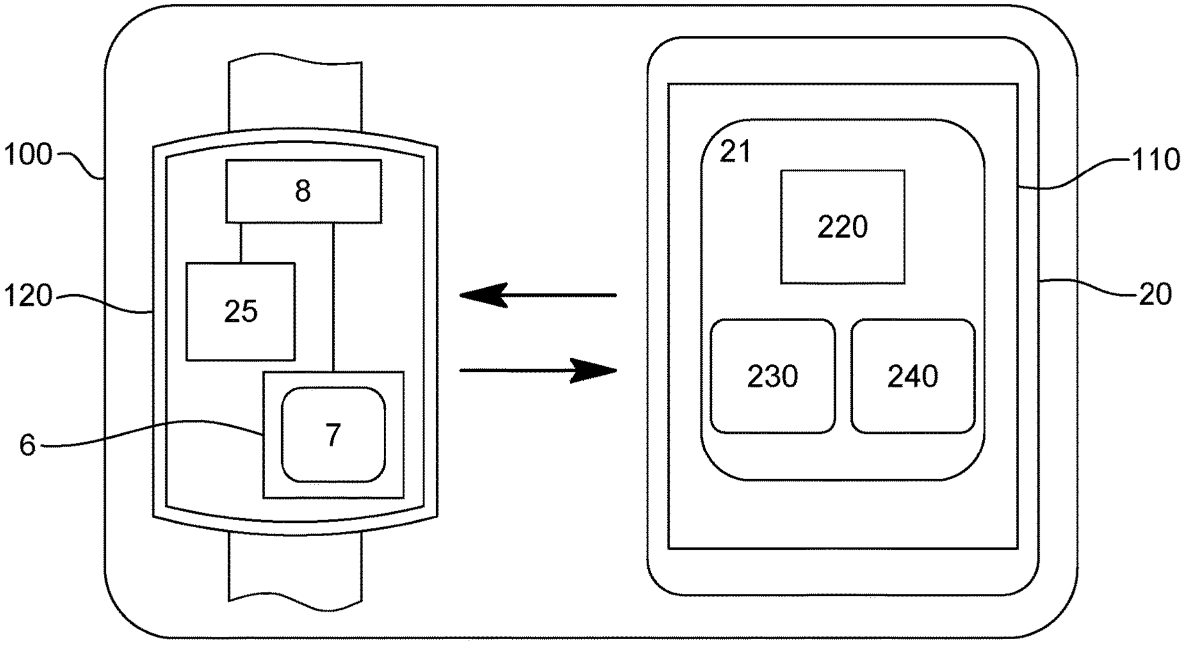
FIG. 1 is a diagrammatic representation of a contrast adjustment system for a watch display device contained in a thermal protection housing, according to various embodiments of the invention.

FIG. 1 shows a system 100 for adjusting the contrast of/for a display device of a watch 10, the case 12 of which is arranged in an enclosure 4 of a housing 1 for the thermal protection 120 of mechanical and/or functional components 5 of this watch 10. Such a system 100 thus makes it possible to adjust/set, in particular dynamically, the contrast of this display device, which can be a dial of the watch 10, according to the visual perception of a user of this protection housing 1. Such an adjustment of the contrast makes it possible to improve the legibility of the information displayed by this display device by taking account of the brightness present in the environment of the housing 1. In particular, it should be noted that this system 100 makes it possible to configure an optimum contrast between one or more graphic representations relating to one or more items of information, and their respective background.

To this end, this system 100 thus comprises the watch 10, the thermal protection housing 1 for the mechanical and/or functional components 5 of said watch 10 and the electronic device 110. In this system 100, the protection housing 1 is provided with a transparent crystal 6 and the electronic device 110 is able to connect to said housing 1, in particular to a control unit 8 of this housing 1, in order to control/manage/adjust the contrast of the display device. It should be noted in particular that this electronic device 110 is configured to be connected to said housing 1 using wireless connection technologies of the NFC (acronym for Near Field Communication), WiFi or Bluetooth type.

By cooperating with the control unit 8, such an electronic device 110 makes it possible to adjust the contrast of this display device by transmitting, as will be seen hereafter, appropriate instructions to the control unit 8 of the housing 1 to vary this contrast.

In this system 100, such a thermal protection housing 1 can also be referred to as an "isothermal case" or "dewar housing". Such a housing 1 can include a bracelet, and thus form a thermal protection device 120 also referred to as an "isothermal device" or "dewar horological device" or even more simply as a "dewar device".

Figure 2:
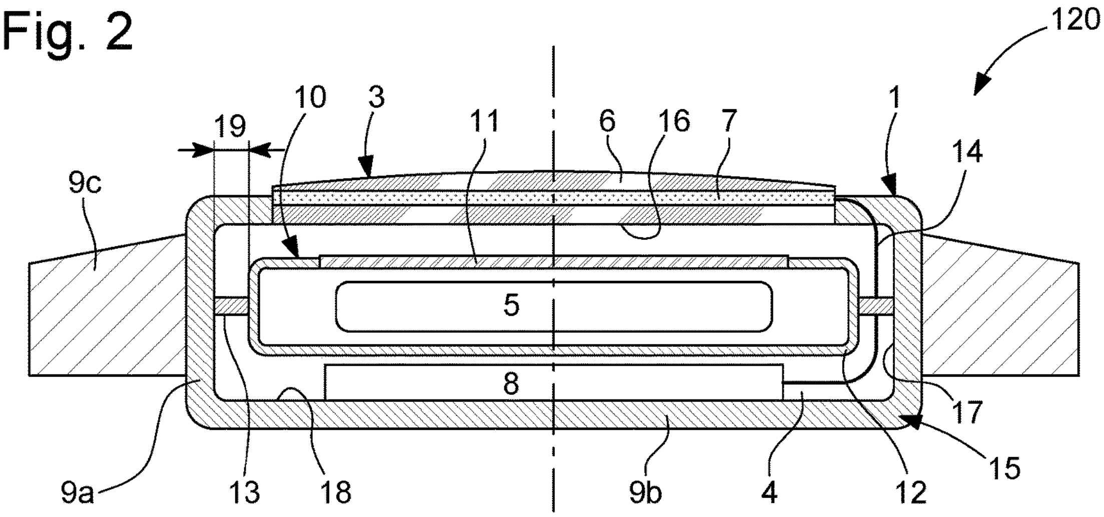
FIG. 2 is a cross-sectional view of the thermal protection housing comprising the watch case, according to the embodiments of the invention.

With reference to FIG. 2, the thermal protection housing 1 of this system 100 is capable of providing good thermal insulation for mechanical and/or functional components 5 of the watch 10, a case 12 of which must be arranged in an enclosure 4 of this housing 1 in order to provide such thermal insulation for these components 5. In other words, this housing 1 is formed in particular by the combination of its functional elements 15 with the case 12 of the watch 10 in order to provide suitable thermal insulation for these mechanical and/or functional components 5. These functional elements 15 of the housing 1 forming this said enclosure 4 comprise a crystal 6, an inner peripheral wall 17 of a middle 9*a* and a back 9*b* of this housing 1. In this configuration, the case 12 of the watch 10 is arranged in such an enclosure 4 while being kept away from or at a distance from the functional elements of the housing 1 forming said enclosure 4. It should be noted that this inner peripheral wall 17 of the middle 9*a* is also that of said enclosure 4.

In this system 100, the housing 1 comprises the crystal 6 which is a transparent crystal 6 with variable brightness/illumination oriented towards the display device of the watch 10, and a control unit 8 connected to this crystal 6 which is configured to control/manage/set/adjust this brightness/illumination. When the watch case 12 is arranged in the enclosure 4 of this housing 1, a visible face of the display device is thus positioned facing this crystal 6, in particular facing an internal face 16 of this crystal 6. This visible face can be used to display information relating to time indications or functions implemented by the watch 10.

In this context, the control unit 8 comprises an electronic circuit including a controller provided with hardware resources, in particular at least one processor cooperating with memory elements as well as data and control address buses, in addition to an energy accumulator otherwise referred to as a battery. This control unit 8 includes, in its memory elements, an algorithm for managing the adjustment of the contrast of the display device of the watch 10 on the basis of instructions received from the electronic device 110. Such an algorithm is executed by the processor of this control unit 8 taking account of these instructions.

The housing 1 can comprise event sensors 25 included in the control unit 8. Such sensors 25 can generate data relating to events detected by these sensors, said events being likely to contribute to/cause/generate a variation in the ambient brightness in the environment of the housing 1 and which can disrupt/alter the reading of the information present on/in the display device. These events are likely to cause a variation in the ambient brightness in the environment of the housing 1. These events can include, but are not limited to: the detection of a particular level of brightness in the environment of the housing 1, in particular light radiation such as solar radiation, etc.

In this context, the event sensor comprises in particular and in a non-limitative and non-exhaustive manner a brightness sensor comprising a solar radiation sensor and/or an infrared solar radiation sensor and/or an ultraviolet solar radiation sensor.

It should be noted that the event sensor forms part of the control unit 8 and is connected to the controller of this unit. The brightness sensor is arranged in the housing 1 and in particular in at least one of the functional elements 15 of this housing 1 so as to be exposed to the light coming from the environment outside the housing 1. By way of example, this brightness sensor can be arranged in the body of the crystal 6 of this housing 1 and/or on an internal face 16 of this crystal 6.

In this housing 1, the control unit 8 comprises a substrate such as a flexible PCB on which its electronic circuit is arranged, with the exception of the brightness sensor which can be included in the crystal 6 or on the internal face 16 of this crystal 6 of the housing 1. In this context, this circuit can be built on this substrate using three-dimensional printing processes or polymer printing processes. It should be noted that this substrate is arranged in the enclosure 4 on one of the functional elements 15 such as the back 9*b* or on the inner peripheral wall 17 of the enclosure 4.

As mentioned above, the control unit 8, and in particular its controller, is linked/connected to the crystal 6 of the housing 1 via a connecting element 14. Such a crystal 6 consists of a substrate and a transparent device 7 for dynamically varying the brightness/lighting/illumination arranged in or on this substrate. This substrate is made of a material such as glass, for example mineral glass, acrylic glass, optical ceramic or sapphire glass. In this crystal 6, such a dynamic brightness variation device 7 is, for example, a transparent lighting element, in particular an organic light-emitting diode lighting element known by the acronym OLED.

Such an OLED-type lighting element comprises a stack of transparent functional layers comprising layers of organic light-emitting materials supplied with electricity by transparent electrodes, typically in the form of first and second electrically conductive layers, of this stack, flanking this/these layer(s) of material(s). Such a lighting element 7 of the OLED type can be designed to emit polychromatic radiation defined at 0° by coordinates (x1, y1) in the CIE 1931 XYZ colour space, which coordinates are thus given for radiation to the normal. This transparent lighting element 7 is configured to emit light radiation in the direction of the display device or directed towards the display device.

In a non-limitative and non-exhaustive way, the light-emitting layers can comprise small molecules, referred to as SM-OLEDs (Small Molecule Organic Light Emitting Diodes), or polymers, referred to as PLEDs (Polymer Light Emitting Diodes).

In a first alternative embodiment of the crystal 6 of the housing 1, the dynamic brightness variation device 7 is arranged/applied/printed/deposited on a lower surface of the substrate, thus forming the internal face 16 of this crystal 6.

In a second alternative embodiment of the crystal 6 of the housing 1, the dynamic brightness variation device 7 is included in the body of the substrate forming this crystal 6 of the housing 1. In this context, this substrate can be formed of two layers of transparent material such as glass, between which layers the dynamic brightness variation device 7 is arranged.

It should be noted that the presence of the dynamic brightness variation device 7 in or on the substrate included in the crystal 6 does not alter the transmittance properties of this crystal 6 of the housing 1.

Thus, the control unit 8, by executing control/adjustment instructions received from the electronic device 110, then controls an electrical voltage applied to the first and second electrically conductive layers of the dynamic brightness variation device 7, making it possible to vary the illumination/light intensity applied to the display device, and in particular the distribution of the illumination/light intensity over this display device. Thus, the control unit 8 is able to configure a contrast of the display device which is adapted to the surrounding brightness, with a view to facilitating the reading of this display device and/or increasing the reading comfort of the user of this housing 1.

This variation in this lighting/illumination generated by the dynamic brightness variation device 7, otherwise referred to as light intensity variation, takes place between two states. A first state relating to a maximum light intensity and a second state relating to a zero light intensity.

In this system 100, the electronic device 110, also referred to as a user terminal, is a device 110 capable of being worn and carried by the user of the thermal protection device 120. This is the case, for example, with a smartphone, a phablet or a tablet. This electronic device 110 comprises a housing 20 in which an electronic circuit 21 is arranged. This electronic circuit 21 comprises a controller 22 and a communication unit 23, in particular a near-field communication (NFC) unit 23 or a communication unit operating using wireless technologies such as Bluetooth or WiFi, both powered by a battery. This controller 22 is able to execute instructions to implement a computer program configured to, for example, process requests/instructions/data from/to the housing 1, in particular its control unit 8. The electronic device 110 can further include a camera and an input interface such as a touch screen or buttons.

This device 110 further includes event sensors 24 such as, for example, a brightness sensor for detecting the level of ambient brightness. These events are likely to cause a variation in the ambient brightness of the environment of the device 110. These events can include, but are not limited to: the detection of a particular level of brightness in the environment of the device 110, in particular light rays such as solar rays, etc.

Furthermore, such a controller 22 is in particular able to execute instructions for implementing a computer program which is configured to process, for example, the requests/instructions/data received/sent to/from the control unit 8 of the housing 1.

Furthermore, this controller 22 is further capable of executing a computer program also referred to as an "application" or "app". More specifically in this context, the application is an "application for adjusting the contrast of the display device". When executed by the controller 22, this application is thus able to generate at least one instruction aimed at ensuring immediate or automatic management of the contrast of the display device.

It should be noted that when this application is executed by the electronic device 110, an interface generated by the execution of this application is thus displayed on the screen of this device 110, allowing the user, by interacting with this interface, to:

configure a brightness setpoint corresponding to automatic/dynamic contrast management of the display device;

adjust the contrast of this display device, corresponding to instant management of the level of contrast required as a function of the user's visual perception of the display device.

It is thus understood that the controller 22 is able to generate an instruction for controlling/adjusting the contrast of the display device as a function, in particular, of the brightness setpoint which is transmitted to the control unit 8 of this housing 1. Under these conditions, the control unit 8 will thus control/adjust this contrast as a function of both the brightness measured by this unit 8 and the brightness setpoint to be respected. To do this, the control unit 8 is configured to control/command the dynamic brightness variation device 7 accordingly.

In some embodiments, this controller 22 is able to generate an instruction for controlling/adjusting the contrast of the functional display device, said instruction thus being relative to the brightness setpoint which is transmitted to the control unit 8 of this housing 1. Under these conditions, the control unit 8 will dynamically control/adjust this contrast as a function of both the brightness measured by this unit 8 using its event sensors 25, and the brightness setpoint to be respected. Such a control unit 8 is configured to control/command the dynamic brightness variation device 7 accordingly. The controller 22 of this electronic device 110 is thus configured to contribute, alongside the control unit 8 provided with its sensors 25, to controlling the dynamic brightness variation device 7 so as to ensure adjustment, in particular dynamic adjustment, of the contrast of the display device. Moreover, these embodiments can provide for a variation in said setpoint to be complied with, which is then transmitted by the controller 22 of the device 110 as soon as one or more events are detected by the event sensors 24 of the device 110. Thus, the electronic device 110 is configured to contribute, alongside the control unit 8 provided with its sensors 25, to controlling the dynamic brightness variation device 7 so as to adjust the contrast of the display device. In an alternative embodiment, the electronic device 110 provided with its sensors 24 is configured to contribute, alongside the control unit 8 provided with its sensors 25, to controlling the dynamic brightness variation device 7 so as to adjust the contrast of the display device.

The controller 22 is further able to generate an instruction for controlling/adjusting the contrast of the display device as a function of a level of adjustment of this contrast, which is transmitted to the control unit 8 of this housing 1. Under these conditions, the control unit 8 will thus control/adjust the contrast of the display device as a function of the adjustment level selected by the user from the interface generated by the execution of the application by the device 110. To do this, the control unit 8 is configured to control/command the dynamic brightness variation device 7 accordingly.

It is thus understood that the electronic device 110 is configured to adjust the contrast of the display device by generating and transmitting at least one control instruction for the dynamic brightness variation device 7 of this crystal 6. On this basis, the control unit 8 of the housing 1 is thus configured to vary the contrast of the display device as a function of said at least one command instruction for the dynamic brightness variation device received by this device 10.

Moreover, as previously mentioned, the case 12 of the watch 10 is arranged in the thermal protection housing 1 while being spaced apart or held at a distance 19 or an interval 19 from the inner peripheral wall 17 of the enclosure 4, thanks to the reversible fastening device 13 of the housing 1. In other words, such a fastening device 13 is capable of configuring a spacing 19 between said box 12 and functional elements of the housing 1 forming said enclosure 4. In this configuration, the fastening device 13 helps to reduce or even eliminate any heat conduction between the inner peripheral wall 17 of the middle 9*a* (or of the enclosure 4) and/or the back 9*b* and/or the crystal 6 with the case 12 of the watch 10, in particular with an external overall face of this case 12. This external overall face comprises an upper face comprising the crystal 11 of the case 12 of this watch 10, a lower face comprising a back of said case 12 and an external peripheral wall of a middle of this case 12.

In this configuration, the fastening device 13 for reversibly fastening the case 12 of the watch 10 to the inner peripheral wall 17 of the enclosure 4 of this housing 1 can comprise:

- connecting members, each having first and second ends capable of connecting respectively to the case 12 of the watch 10 and to the inner peripheral wall 17 of the enclosure 4 of this housing 1. The body of each member has a particular structure which helps to reduce heat loss to the external environment of the housing 1 and thus to ensure a stable internal temperature in the case 12 of the watch 10, and/or
- connecting members configured to magnetically secure said case 12 of the watch 10 in said enclosure 4. In fact, these connecting members are configured to ensure and maintain a spacing 19 between said case 12 and the functional elements 15 forming said enclosure 4 of the housing 1. Such connecting members help to reduce or even eliminate any heat conduction between the inner peripheral wall 17 of the middle 9*a* and/or the back 9*b* and/or the crystal 11 with the case 12 of the watch 10, in particular with an external overall face of this case 12.

It should be noted that the case 12 is included in a watch 10, which can be an electronic watch, such as a quartz watch, or a mechanical or electromechanical watch.

The above-mentioned mechanical and/or functional components 5 of the watch 10 include, but are not limited to: a horological movement, a display device such as a dial, hands, rings, packing and/or electronic and/or electrical components. It should be noted in particular that such electronic and/or electrical components include, for example, a display device, a processor, a memory, an energy storage component, a motor, an integrated circuit and an electronic oscillator, etc.

In this context, the housing 1 comprises the middle 9*a* on which is mounted a bracelet 9*c* allowing a user of this protection device 120 to wear it. This housing 1 further includes the crystal 6 and the back 9*b* mentioned earlier. In this housing 1, it should be noted that the crystal 6 preferably comprises a surface that is substantially greater than or strictly greater than a crystal 11 of the case 12 of the watch 10. In other words, the internal face 16 of the crystal 6 has a surface that is substantially greater than or strictly greater than or equal to that of an upper face of the crystal 11 of the watch 10.

As we have seen, the functional elements 15 such as the crystal 6, the middle 9*a* and the back 9*b* of this housing 1 together define the enclosure 4 of this housing 1 which is capable of receiving the case 12 of the watch 10. These three elements 15 of the housing 1, namely the middle 9*a*, the crystal 6 and the back 9*b*, can be separate elements which are joined together to construct this enclosure 4. Alternatively, the middle 9*a* and the back 9*b* of the housing 1 can be made in one piece, said one-piece part defining an opening opposite the back 9*b* which is capable of being closed by the crystal 6 in a reversible and hermetically sealed manner. Alternatively, the middle 9*a* and the crystal 6 of the housing 1 of the watch 10 can be made in one piece, said one-piece part defining an opening opposite the crystal 6 which is capable of being closed by the back 9*b*, also in a reversible and hermetically sealed manner.

The middle 9*a* and the back 9*b* are preferably made, in a non-limitative and non-exhaustive manner, of a metallic material, of glass or of thermosetting or thermoplastic polymer resins reinforced with carbon or glass fibres, or even of ceramic materials. It should be noted that when the middle 9*a* and the back 9*b* are transparent or semi-transparent, being made of glass for example, the inner peripheral wall 17 of the middle 9*a* and the inner face 18 of the back 9*b* can be coated with a metallic or similar reflective coating, such as a layer of silver for example.

Furthermore, in this housing, when the case 12 of the watch 10 is arranged in the enclosure 4, the space defined between this case 12 and the inner peripheral wall 17 of the middle 9*a*, the back 9*b* and the crystal 6 is empty of material or virtually empty. In other words, the enclosure 4 is under vacuum or near vacuum.

It is thus understood that in this configuration, this thermal protection housing 1 has the same properties and features as a dewar tube/vessel well known in the prior art. As we have already mentioned, the properties and features of this thermal protection housing 1 help to give it good thermal insulation relative to the extreme temperatures in particular that can prevail in the external environment in which such a housing 1 can be located.

Moreover, it should be noted that the mechanical and/or functional components 5 of the watch 10 can be non-magnetic and/or that the case 12 of the watch 10 can be made of a material or be covered with a coating allowing these components to be insulated from magnetic fields.

Moreover, the fastening device 13 helps to position the case 12 of the watch 10 in this housing 1 so that the crystal 11 of this case 12 of the watch 10 is arranged facing the crystal 6 of the housing 1 so that the information on the dial and/or the display interface of this watch 10 can be perceived through the transparent crystal 6 of the housing 1 by the user wearing the protection device 120.

Such a protection device 120 thus provides the mechanical and/or functional components 5 of the watch 10 with very good thermal insulation from the external environment by reducing or even preventing heat loss by radiation from the components arranged in the case 12 of the watch 10 over a long period of time. Thus, when the temperature outside the housing 1 reaches extreme values, the temperature inside the enclosure 4 remains substantially equal to the temperature present in the case 12 of the watch 10 when it was fitted in the housing 1, typically around 20° C. It should be noted that whatever the temperature conditions of the environment of the thermal protection housing 1, the temperature present in the case 12 of the watch 10 does not hinder the correct operation of the watch 10. This temperature is maintained over a period of time which is 2 to 18 times longer than the period of time during which such a case 12 of the watch 10 would be capable of maintaining an operating temperature of its components when located directly in such an environment with such temperatures, in particular extreme temperatures (i.e. when located outside the housing 1 of the protection device 120). It is thus clear that such a configuration makes it possible to protect the mechanical and/or functional components 5 of the watch 10, and contributes to ensuring that they operate optimally in extreme external temperature conditions.

It goes without saying that the present invention is not limited to the embodiments just described and that various simple modifications and alternative embodiments can be envisaged by a person skilled in the art without departing from the scope of the invention as defined by the appended claims.

The invention claimed is:

1. A contrast adjustment system (100) for a display device of a watch (10) including a case (12) which is configured to be removably arranged in a thermal protection housing (1) for mechanical and/or functional components (5) of said watch (10), the system (100) comprising:

said housing (1), comprising:

an enclosure (4) for thermally protecting the mechanical and/or functional components (5) of said watch (10), said enclosure (4) being formed by functional elements (15) of this housing (1), these elements (15) comprising a middle (9*a*), a back (9*b*) and a crystal (6) including a device (7) for dynamically varying the brightness on a visible face of the display device;

a fastening device (13) fastening said case (12) of the watch (10) in said enclosure (4) while keeping the case away from the functional elements (15);

a control unit (8) connected to the dynamic brightness variation device (7) of the crystal (6), said control unit (8) comprising event sensors (25) capable of causing a variation in the ambient brightness in an environment of the housing;

the watch (10) comprising the display device and the case (12) capable of being removably arranged in said enclosure (4) with the display device facing the crystal (6) of said housing (1);

an electronic device (110) configured to contribute, alongside the control unit (8) provided with its sensors (25), to controlling the dynamic brightness variation device (7) so as to adjust a contrast of the display device.

2. The system (100) according to claim 1, wherein the visible face is capable of contributing to a display of information relating to time indications or to functions implemented by the watch (10), and the visible face is positioned facing the crystal (6) of the housing (1).

3. The system (100) according to claim 1, wherein the visible face is capable of contributing to a display of information relating to time indications or to functions implemented by the watch (10), and the visible face is positioned facing the crystal (6) of the housing (1).

4. The system (100) according to the claim 1, wherein the visible face capable of contributing to a display of information relating to time indications or to functions implemented by the watch (10), and the visible face is positioned facing the crystal (6) of the housing (1), said electronic device (110) being configured to adjust the contrast of the display device by generating and transmitting at least one instruction for controlling the dynamic brightness variation device (7) of this crystal (6).

5. The system (100) according to claim 1, wherein the visible face capable of contributing to a display of information relating to time indications or to functions implemented by the watch (10), and the visible face is positioned facing the crystal (6) of the housing (1), said dynamic brightness variation device (7) of the crystal (6) being configured to be penetrated by any light radiation entering the enclosure of the housing (1), said electronic device (110) being configured to adjust the contrast of the display device by generating and transmitting at least one instruction for controlling the dynamic brightness variation device (7) of this crystal (6), the control unit (8) of the housing (1) being configured to vary the contrast of the display device as a function of said at least one received instruction for controlling the dynamic brightness variation device (7).

6. The system (100) according to claim 1, wherein the control unit (8) of the thermal protection housing (1) is connected by a connecting element (14) to the dynamic brightness variation device (7) of the crystal (6).

7. The system (100) according to claim 1, wherein the visible face capable of contributing to a display of information relating to time indications or to functions implemented by the watch (10), and the visible face is positioned facing the crystal (6) of the housing (1), the dynamic brightness variation device (7) of the crystal (6) being a lighting element, in particular a transparent lighting element of the OLED type.

8. The system (100) according to claim 1, wherein the electronic device (110) comprises a communication unit (21) and a controller (20) configured to control this communication unit (21).

9. The system (100) according to claim 1, wherein said electronic device (110) is configured to be connected to said housing (1) using wireless connection technologies.

10. The system (100) according to claim 1, wherein said enclosure (4) is under vacuum or quasi-vacuum.

11. The system (100) according to claim 1, wherein the crystal (6) has a surface area which is substantially greater than or strictly greater than that of a crystal (11) of the case (12) of the watch (10).

* * * * *